(12) United States Patent  
Engstler

(10) Patent No.: US 6,312,033 B1
(45) Date of Patent: Nov. 6, 2001

(54) RESILIENT WHEEL FOR RAIL VEHICLES

(75) Inventor: Gerhard Engstler, Bühl (DE)

(73) Assignee: GMT Gummi-Metall-Technik GmbH, Buhl (DE)

( * ) Notice: Subject to any disclaimer, the term of this patent is extended or adjusted under 35 U.S.C. 154(b) by 0 days.

(21) Appl. No.: 09/380,297

(22) PCT Filed: Feb. 20, 1998

(86) PCT No.: PCT/DE98/00510

§ 371 Date: Oct. 20, 1999

§ 102(e) Date: Oct. 20, 1999

(87) PCT Pub. No.: WO98/39167

PCT Pub. Date: Sep. 11, 1998

(30) Foreign Application Priority Data

Mar. 4, 1997 (DE) .............................. 197 08 553

(51) Int. Cl.$^7$ .................................. B60B 17/00
(52) U.S. Cl. .................................. 295/11; 295/7
(58) Field of Search .................. 295/11, 7; 152/40, 152/41, 47, 50, 69, 80, 17

(56) References Cited

U.S. PATENT DOCUMENTS

| 1,486,442 | * | 3/1924 | Lord | 152/41 |
|---|---|---|---|---|
| 1,651,009 | * | 11/1927 | White | 152/42 |
| 2,074,341 | * | 3/1937 | Piron | 295/11 |
| 2,086,720 | * | 7/1937 | Malmquist | 295/11 |
| 2,175,118 | | 10/1939 | Hirshfeld | 295/11 |
| 2,273,620 | * | 2/1942 | Piron | 295/11 |
| 2,290,661 | * | 7/1942 | Williams | 152/41 |
| 2,770,278 | * | 11/1956 | Dillon | 152/41 |
| 2,850,065 | * | 9/1958 | Appel | 295/11 |
| 2,895,175 | * | 7/1959 | Reuter et al. | 295/11 |
| 2,911,252 | * | 11/1959 | Templeton | 295/11 |
| 2,923,570 | * | 2/1960 | Jorn et al. | 295/11 |
| 2,954,259 | * | 9/1960 | Kordes | 152/41 |
| 4,765,382 | * | 8/1988 | Sahagian | 152/41 |

FOREIGN PATENT DOCUMENTS

| 330360 | 7/1958 | (CH) . |
|---|---|---|
| 826 755 | 5/1949 | (DE) . |
| 1 104 986 | 4/1961 | (DE) . |
| 1 133 750 | 7/1962 | (DE) . |
| 1957382 | 5/1970 | (DE) . |
| 2142774 | 3/1973 | (DE) . |
| G 74 22 442.3 | 10/1974 | (DE) . |
| 24 06 206 C3 | 8/1975 | (DE) . |
| 33 28 321 C2 | 2/1985 | (DE) . |
| 43 00 553 A1 | 7/1994 | (DE) . |
| 44 30 342 A1 | 8/1995 | (DE) . |
| 197 08 553 A1 | 9/1998 | (DE) . |

* cited by examiner

Primary Examiner—S. Joseph Morano
Assistant Examiner—Long Bao Nguyen
(74) Attorney, Agent, or Firm—Nath & Associates PLLC; Gary M. Nath; Marvin C. Berkowitz

(57) ABSTRACT

The invention relates to a resilient, multi-component wheel for rail vehicles, comprising a rim (2) and hub (11) as well as an elastic element (6, 8) removably inserted between said rim and hub. Said elastic element (6, 8) is configured as a concentric, separate part consisting of a central disk (7), two larger outer disks (5, 9) and two elastomer rings (6, 8) positioned between said disks. Said elastomer rings (6, 8) are made of a plastic material or rubber, can have different shapes depending on the desired type of compressive stress or shear stress and are connected to the disks (5, 9) in a non-positive manner.

15 Claims, 3 Drawing Sheets

RESILIENT WHEEL FOR RAIL VEHICLES

Figure 1:
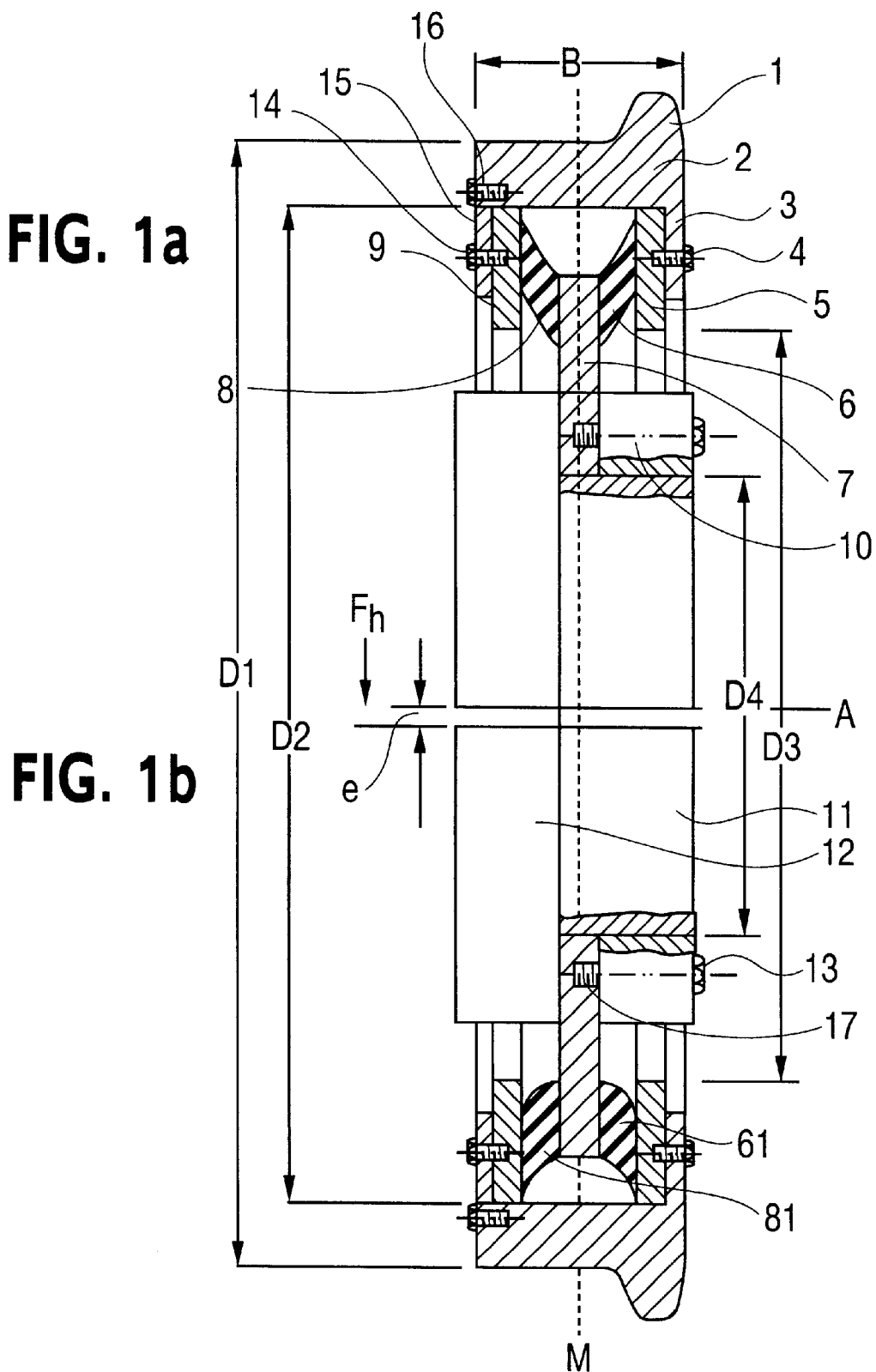

The invention relates to a rubber-sprung, multi-part wheel for rail vehicles with a wheel rim and a wheel hub as well as an interposed, releasable spring element.

Such wheels are often used in trolleys in order to minimize sound emissions or reduce non-sprung masses for other reasons.

In known rubber-sprung wheels for rail vehicles of the initially mentioned type, rubber plates are arranged parallel to each other (DE-PS 19 57 382, DE-PS 21 42 774). The rubber plates hereby stand under a pressure load because of the pre load exerted by screws, but are otherwise loaded almost exclusively axially. This combined load results in very long spring excursions and intense flexing work. The assembly is complicated.

In a similar manner, DE 43 00 552 A1 attempts to control the pressure and thrust tensions in a rubber-sprung wheel for rail vehicles. The fact that this is not always successful is shown by an elastic stop provided on the wheel hub which elastically catches the wheel rim in its movement relative to the wheel hub if the predefined spring excursions of the rubber disks that are arranged in a V-shape are exceeded. The assembly of the individual rubber disks and the manufacturing of precise angled surfaces on the parts of the wheel for rail vehicles is complex.

CH 156 916, DE 24 06 206 C3 and DE 33 28 321 C2 describe spring elements which are built between wheel hub and wheel rim in such a way that they are in essence only loaded by pressure. The assembly of the rubber parts is complex, since a tilting and pinching of the rubber rings must be prevented. The elasticity of the wheels is naturally very low, whereby however the ratio of axle load to spring excursion and/or hardness of the rubber also plays a role.

DE 44 30 342 A1 suggested a rubber-sprung wheel in which an axle load causes the load on the preloaded rubber elements, i.e., paired rubber disks designed in the shape of a V-shape or summarily as a truncated cone, to be relieved between wheel hub and wheel rim while they are loaded more in the zenith area, i.e., the rubber elements are put under pressure in the zenith area.

In all cases of the state of the art, it is hard to assemble the wheel for rail vehicles consisting of wheel rim and wheel hub with the elastic parts to be installed since the arrangement of the rubber disks or otherwise designed rubber parts must be exactly symmetrical. Rubber parts, especially parts on which pressure is exerted, are subject to such intense flexing work that they develop significant heat after a short time and are damaged or destroyed after a certain load (axle load measured in tons times kilometers).

In the case of the invention at hand this results in the problem of a quick and simple assembly and disassembly of replaceable spring elements, whereby the spring elements should be stressed as little as possible with the help of a corresponding design.

According to the invention this problem is solved with the characteristics of claim 1. Further developments of the invention are found in the secondary claim.

The rubber-sprung wheel for rail vehicles according to the invention consists essentially of the wheel rim and the wheel hub with an interposed spring element comprising a center disk or an inner ring and two outer disks or annular plates between which an elastomer ring or rubber ring is fixed. The disks are preferably in a concentric or plan-parallel arrangement to each other, but may also form an angle relative to each other with their surfaces, as is the case in the state of the art. It is preferred that a complete spring element forms a system that is mirror symmetrical to a center plane of the center disk, orthogonally to the wheel axle or the axis of the wheel hub. This includes an identical shape of the two outer disks and the elastomer rings between the center disk and the outer disks.

In connection with the invention it is important that the spring element as such can be installed complete or in one piece between the wheel hub and the wheel rim and, to the extent this is reasonable or necessary for the design of the rail vehicle, for example a trolley, can be mounted with a preload. In a preferred embodiment the elastomer rings are adhesive, i.e., have been fixed to disks, usually steel disks, by vulcanizing or gluing with suitable glue. For this purpose both rubber mixtures as well as special—actually known—plastics mixtures are suitable. The section of the rings show that the spring element is oriented in a V-shape. This orientation makes it possible to put the elastomer rings under a preload relative to the inner ring or the center disk by screwing the outer rings at a predefined site into the wheel rim. On the other hand, the final assembly could also consist of first mounting the outer rings to the wheel rim, and then mounting the inner ring or the center disk with the help of suitable devices to the wheel hub. Both the outer disks on the wheel rim and the center disk on the wheel hub are able to hereby put the spring element under a preload with the help of actually known screw connections. The spring element that is constructed and mounted in this way can be easily premanufactured and, following disassembly of the wheel rim, can be easily pulled off the hub and replaced with another element.

Depending on the type of materials and their shape and load, the creeping behavior of the elastomer rings must be observed. In the case of a load mostly due to thrust forces, rubber mixtures or equivalent plastics that are primarily very low-curing should be used.

The spring elements according to the invention exert almost exclusively an axial load on the elastomer rings, so that the spring element absorbs a high radial spring deflection without entering the critical load range of the elastomer. This is the case in particular when the diameter of the elastomer rings increases towards the outer disks so that the center ring or the center disk dips into the wheel rim when the wheel axle is loaded radially against the reaction force of the elastomer rings.

If the rubber elements or elastomer rings are constructed mirror-symmetrical to the center plane of the center disk, this creates a corresponding, symmetric, high axial stiffness of the wheel, in particular if the center plane splits the width of the wheel rim in half.

Such a spring element can be adapted to any wheel rim diameters and hub diameters by varying the disk diameter; in the same way, it is possible to forsake plan-parallel disks by modifying the vulcanized elastomer rings with their V-shaped cross-section and to change over to slightly V-shaped disks if corresponding axial loads are expected or a pressure load on the elastomer rings is desired.

The following is intended to explain the invention in reference to a drawing with several schematic exemplary embodiments. Hereby:

FIGS. 1a,b show a wheel for rail vehicle with two different elastomer types

FIGS. 2 to 11 show wheel rims with different arrangements of elastomer rings in the spring elements.

In the following text, identical or similar parts are designed with identical reference numbers. Only the parts of the spring elements are identified with different reference numbers.

FIGS. 1a and 1b together show a wheel for rail vehicles according to the invention, having the wheel axle A and hub parts 11, 12. The bore for the vehicle axis and the usual fixation of the wheel rim, here by means of a center disk 7, against axial and radial displacement, are not shown for reasons of clarity. Only the thrust pieces 10 and their interlocking connection with the center disk 7 through the screw connection 13 are shown. A wheel rim 2 with a width B and a running diameter D1 has a wheel flange 1 and a support flange 3; it is connected via the spring element 5,6,7,8,9 with the hub of the wheel. The spring element is on the one side screwed via the outer disk 5 with screws 4 to the support flange 3, while the second outer disk 9 is fixed via the cover disk 15 and the screw connections 14, 16 to the wheel rim 2.

Plastic rings 6, 8 vulcanized onto the disks are arranged between the outer disks 5, 9 and the center disk 7 that is held on the hub 11 with the diameter D4. The rings have diameters that rise from the center disk 7 to the steel outer rings 5 and 9 with their diameters D3 and D2. The spring element is arranged and constructed mirror-symmetrically to the center plane M of the center ring 7 and in the center of the width B of the wheel rim. The adhesive connection of the hub with the wheel rim is brought about by elastomer rings 6 and 8 whose spring property limits the non-sprung masses of the vehicle to the wheel rims. FIG. 1b shows a uniformly constructed spring element, but with vulcanized rubber rings 61, 81 which have the same spring properties as the rings 6, 8. When loaded with half the axle load Fh, the axle A elastically springs by an amount e into the wheel rim and hereby deforms the elastomer rings 61 and 81 which have been shown in their working position at the lower cusp point, while the load on the rings 6, 8 in the zenith of the wheel is relieved. The vertical offset of the center disk hereby depends on both the spring stiffness of the elastomer rings as well as on the horizontal distortion or its deformation during installation, as the expert will easily recognize. These variations also will make it possible to determine the degree of the existing respective traction and pressure tensions in the rings.

Figure 2:
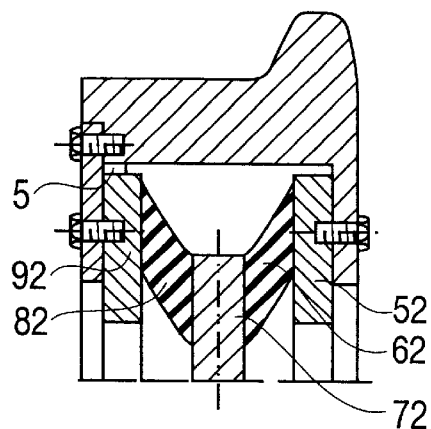
Figure 3:
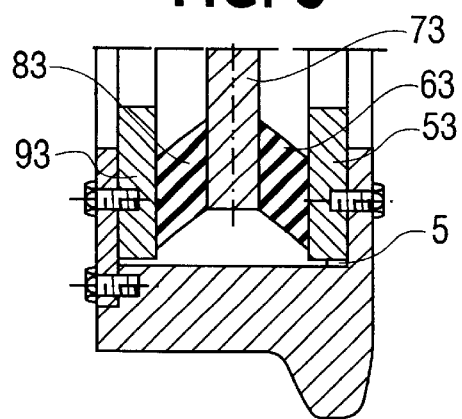

FIGS. 2, 3 in a similar manner show glued plastic rings 62, 82 between the steel disks 52, 72, 92, or rubber rings 63, 83 between the disks 53, 73, 93 of other wheels for rail vehicles. It is not essential for the invention whether the outer disks have a play s in relation to the wheel rims or not. The play facilitates the exchange of the spring elements with variable wheel rims.

Figure 4:
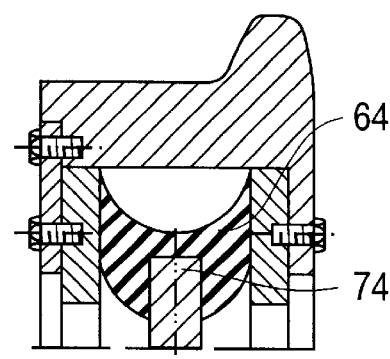
Figure 5:
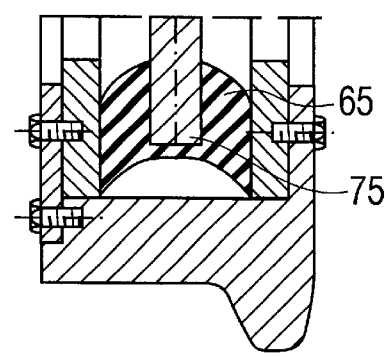
Figure 6:
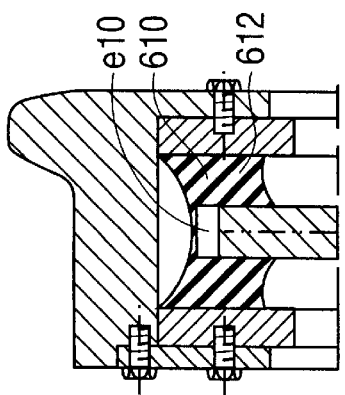
Figure 7:
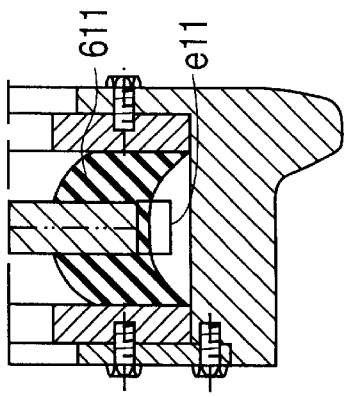
Figure 8:
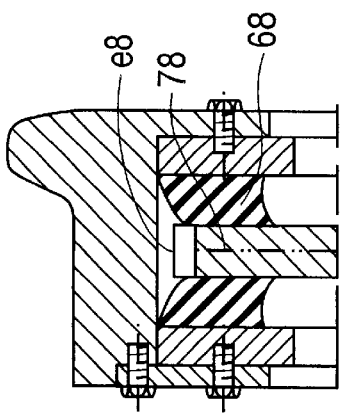
Figure 9:
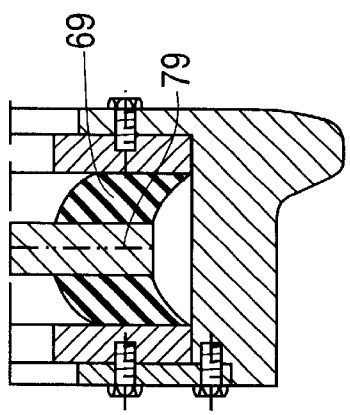
Figure 10:
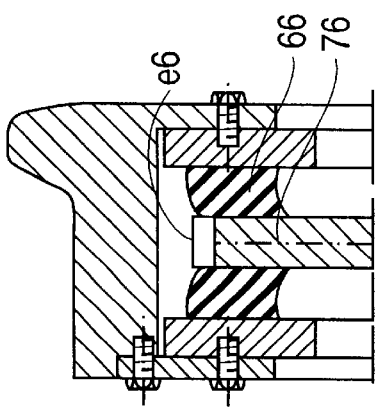
Figure 11:
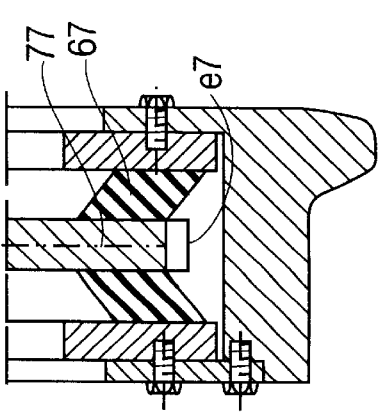

FIGS. 4 or 5 show elastomer rings of plastic 64 or rubber 65 in which the two rings in each case enclose the center disks 74, 75 as a one-piece ring. The same situation is still shown in FIGS. 10 and 11, whereby in both cases the elastic play e10 or e11 of the elastomer rings 610 or 611 is shown in the drawing. 612 refers to an enclosure with which the rings can be adjuster to be less or more hard, if required.

FIGS. 6 to 9 also show various types of designs of the rings 66, 67, 68, 69 relative to their arrangement at the center disks 76, 77, 78, 79 and their play e6, e7, e8.

What is claimed is:

1. A rubber-sprung, multi-part wheel for rail vehicles comprising:

a wheel rim having a first side and a second side;

a wheel hub; and a releasable spring element interposed between said rim and said hub, said spring element further comprising:

a separate center disk connected to said hub, said center disk having a first side and a second side;

a first outer disk connected to said first side of said rim;

a second outer disk connected to said second side of said rim;

a first elastomer ring disposed between a first side of said center disk and said first outer disk; and a second elastomer ring disposed between a second side of said center disk and said second outer ring;

wherein said rim, said hub, said center disk, and said first and second outer disks are mutually concentrically axially aligned.

2. The wheel for rail vehicles according to claim 1, characterized in that one of the first and second elastomer rings is connected adhesively to the center disk.

3. The wheel for rail vehicles according to claim 1, characterized in that a size of a diameter of the first elastomer ring increases axially from a first smaller size nearer the center disk to a first larger size, greater than the first smaller size, nearer the first outer disk.

4. The wheel for rail vehicles according to claim 1, characterized in that the first outer disk is releasably connected to the wheel rim.

5. The wheel for rail vehicles according to claim 1, characterized in that the center disk is releasably connected to the wheel hub.

6. The wheel for rail vehicles according to claim 1, characterized in that the first and second outer disks are arranged mirror-symmetrically about a center plane of the center disk.

7. The wheel for rail vehicles according to claim 6, characterized in that the center plane splits a width of the wheel rim in half.

8. The wheel for rail vehicles according to claim 1, characterized in that a circumferential outer edge of the center disk is enclosed by the first and second elastomer rings.

9. The wheel for rail vehicles according to claim 1, characterized in that the first and second elastomer rings each comprise a low-curing rubber mixture or plastic mixture.

10. The wheel for rail vehicles according to claim 1, characterized in that one of the first and second elastomer rings is connected adhesively to a corresponding one of the first and second outer disks.

11. The wheel for rail vehicles according to claim 1, characterized in that a size of a diameter of the second elastomer ring increases axially from a second smaller size nearer the center disk to a second larger size, greater than the second smaller size, nearer the second outer disk.

12. The wheel for rail vehicles according to claim 1, characterized in that the second outer disk is releasably connected to the wheel rim.

13. The wheel for rail vehicles according to claim 1, characterized in that the first and second elastomer rings are arranged mirror-symmetrically about a center plane of the center disk.

14. The wheel for rail vehicles according to claim 13, characterized in that the center plane splits a width of the wheel rim in half.

15. The wheel for rail vehicles according to claim 1, characterized in that said first and second elastomer rings are integrally connected to each other.

* * * * *